(12) United States Patent
Matsuo et al.

(10) Patent No.: US 12,480,909 B2
(45) Date of Patent: Nov. 25, 2025

(54) SOLID ELECTROLYTE, ELECTROCHEMICAL ELEMENT, AND LIMITING CURRENT TYPE GAS SENSOR (71) Applicant: Mitsui Mining & Smelting Co., Ltd., Tokyo (JP)

(72) Inventors: Haruki Matsuo, Ageo (JP); Tokiharu Oyama, Ageo (JP); Yuya Komori, Ageo (JP); Atsuro Sumiyoshi, Ageo (JP); Shingo Ide, Ageo (JP)

(73) Assignee: MITSUI MINING & SMELTING CO., LTD. (JP)

( * ) Notice: Subject to any disclaimer, the term of this patent is extended or adjusted under 35 U.S.C. 154(b) by 0 days.

(21) Appl. No.: 18/567,660

(22) PCT Filed: Mar. 14, 2023

(86) PCT No.: PCT/JP2023/009783
§ 371 (c)(1),
(2) Date: Dec. 6, 2023

(87) PCT Pub. No.: WO2023/176811
PCT Pub. Date: Sep. 21, 2023

(65) Prior Publication Data
US 2024/0288401 A1 Aug. 29, 2024

(30) Foreign Application Priority Data
Mar. 17, 2022 (JP) .................. 2022-042996

(51) Int. Cl.
G01N 27/407 (2006.01)
G01N 27/409 (2006.01)

(52) U.S. Cl.
CPC ..... G01N 27/4073 (2013.01); G01N 27/4075 (2013.01); G01N 27/409 (2013.01)

(58) Field of Classification Search
CPC ........... G01N 27/4073; G01N 27/4075; G01N 27/409; G01N 27/41; Y02E 60/50
See application file for complete search history.

(56) References Cited

U.S. PATENT DOCUMENTS

| 4,595,485 A | 6/1986 | Takahashi et al. |
| 5,348,630 A | 9/1994 | Yagi et al. |
| (Continued) | | |

FOREIGN PATENT DOCUMENTS

| JP | S59-166854 A | 9/1984 |
| JP | H02-147853 A | 6/1990 |
| (Continued) | | |

OTHER PUBLICATIONS

International Search Report of the International Searching Authority, issued in PCT/JP2023/009783, mailed May 16, 2023; ISA/JP (5 pages).

Primary Examiner — C. Sun
(74) Attorney, Agent, or Firm — Harness, Dickey & Pierce, P.L.C.

(57) ABSTRACT

A solid electrolyte assembly includes a substrate, a solid electrolyte, and a first electrode and a second electrode. The solid electrolyte has oxide ion conductivity, and the first electrode is located under the solid electrolyte and contains a porous material. The first electrode has only one oxygen diffusion path that is formed overlapping the substrate and the solid electrolyte. When Sr represents the smallest cross-sectional area that is a cross-sectional area of the oxygen diffusion path at a location where the area of a cross section of the first electrode taken perpendicularly to an oxygen diffusing direction is smallest in a portion of the oxygen diffusion path where the oxygen diffusion path overlaps the substrate and the solid electrolyte in a plan view of the solid electrolyte assembly, and Sp represents the area of a region (Continued)

where the first electrode and the second electrode overlap each other in a plan view of the solid electrolyte, $S_r/S_p$ is from $1\times10^{-7}$ to $6.9\times10^{-4}$.

20 Claims, 7 Drawing Sheets

(56) References Cited

U.S. PATENT DOCUMENTS

| 2015/0377823 | A1* | 12/2015 | Akasaka | G01N 27/4074 156/60 |
|---|---|---|---|---|
| 2017/0122898 | A1 | 5/2017 | Akasaka | |

FOREIGN PATENT DOCUMENTS

| JP | H05-6365 U | 1/1993 |
| JP | H06-242067 A | 9/1994 |
| JP | 2015-212649 A | 11/2015 |
| JP | 2021-21711 A | 2/2021 |
| WO | 2017-014033 A1 | 1/2017 |
| WO | 2024-185558 A1 | 9/2024 |

* cited by examiner

SOLID ELECTROLYTE, ELECTROCHEMICAL ELEMENT, AND LIMITING CURRENT TYPE GAS SENSOR

CROSS REFERENCE TO RELATED APPLICATIONS

This application is a 371 U.S. National Phase of International Application No. PCT/JP2023/009783, filed on Mar. 14, 2023, which claims priority to Japanese Patent Application No. 2022-042996, filed Mar. 17, 2022. The entire disclosures of the above applications are incorporated herein by reference.

BACKGROUND

Technical Field

The present invention relates to a solid electrolyte assembly. The present invention also relates to an electrochemical element and a limiting current type gas sensor. The solid electrolyte assembly of the present invention is applicable to various fields in which its oxide ion conductivity is used.

Related Art

Various oxygen sensors using solid electrolytes having oxide ion conductivity are known. These oxygen sensors are broadly classified into an electromotive force type and a limiting current type. For example, US 2015/0377823A1 discloses a limiting current type gas sensor including a solid electrolyte layer having ion conductivity formed on an Si substrate, a pair of positive and negative porous electrodes formed on the solid electrolyte layer, and a porous membrane formed on the solid electrolyte layer and the pair of the positive and negative porous electrodes. In this limiting current type gas sensor, a saturation phenomenon in which the current remains constant even when the voltage applied between the electrodes is increased is induced by limiting, using the porous membrane, the amount of oxygen gas which the solid electrolyte layer is allowed to suck in.

However, the limiting current type gas sensor disclosed in US 2015/0377823A1 requires the porous membrane that is provided separately from the electrodes in order to limit the amount of oxygen gas supplied to the solid electrolyte layer. For this reason, the gas sensor disclosed in US 2015/0377823A1 is complicated to produce. In addition, oblique deposition, plasma spraying, or anodization may need to be performed to form the porous membrane, and this may result in an increase in the lead time necessary to produce the sensor.

Therefore, it is an object of the present invention to provide a solid electrolyte assembly useful for a limiting current type gas sensor that can eliminate the various disadvantages of the conventional techniques described above.

SUMMARY

The present invention provides a solid electrolyte assembly comprising:
a substrate;
a solid electrolyte disposed on or above the substrate; and
a first electrode and a second electrode that are arranged opposed to each other via the solid electrolyte,
wherein the solid electrolyte has oxide ion conductivity,
at least a portion of the first electrode is located between the substrate and the solid electrolyte and contains a porous material,
in a plan view of the solid electrolyte assembly, the first electrode has only one oxygen diffusion path that is formed overlapping the substrate and the solid electrolyte, and
the solid electrolyte assembly satisfies the condition that Sr/Sp is from $1.0 \times 10^{-7}$ to $6.9 \times 10^{-4}$.
wherein Sr represents a smallest cross-sectional area that is a cross-sectional area of the oxygen diffusion path at a location where an area of a cross section of the first electrode taken perpendicularly to an oxygen diffusing direction is smallest in a portion of the oxygen diffusion path where the oxygen diffusion path overlaps the substrate and the solid electrolyte in the plan view of the solid electrolyte assembly, and
Sp represents an area of a region where the first electrode and the second electrode overlap each other in a plan view of the solid electrolyte.

Also, the present invention provides A solid electrolyte assembly comprising: a substrate;
a solid electrolyte disposed on or above the substrate; and
a first electrode and a second electrode that are arranged opposed to each other via the solid electrolyte,
wherein the solid electrolyte has oxide ion conductivity,
at least a portion of the first electrode is located between the substrate and the solid electrolyte and contains a porous material,
in a plan view of the solid electrolyte assembly, the first electrode has a plurality of oxygen diffusion paths that are formed overlapping the substrate and the solid electrolyte, and
the solid electrolyte assembly satisfies the condition that $\Sigma Sr/Sp$ is from $1.0 \times 10^{-7}$ to $6.9 \times 10^{-4}$,
wherein Sr represents a smallest cross-sectional area that is a cross-sectional area of each oxygen diffusion path at a location where an area of a cross section of the first electrode taken perpendicularly to an oxygen diffusing direction is smallest in a portion of the oxygen diffusion path where the oxygen diffusion path overlaps the substrate and the solid electrolyte in the plan view of the solid electrolyte assembly, and $\Sigma Sr$ represents a sum total of the smallest cross-sectional areas Sr of the respective oxygen diffusion paths, and
Sp represents an area of a region where the first electrode and the second electrode overlap each other in a plan view of the solid electrolyte.

Also, the present invention provides an electrochemical element including the solid electrolyte assembly.

Furthermore, the present invention provides a limiting current gas sensor including the electrochemical element, wherein a relationship between a current value and an oxygen concentration is linear.

DETAILED DESCRIPTION

Figure 1:
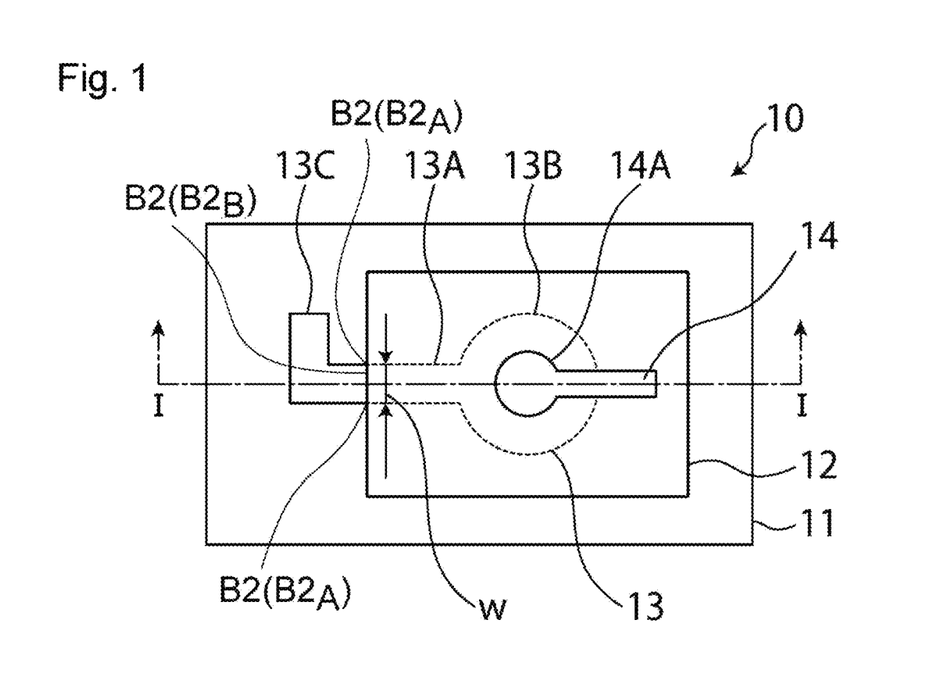
FIG. 1 is a plan view showing the structure of an embodiment of a solid electrolyte assembly of the present invention.

Hereinafter, the present invention will be described based on preferred embodiments thereof with reference to the drawings. FIG. 1 is a plan view showing the structure of an embodiment of a solid electrolyte assembly of the present invention, and FIG. 2 is a cross-sectional view of the solid electrolyte assembly shown in FIG. 1, taken along line I-I.

Figure 2:
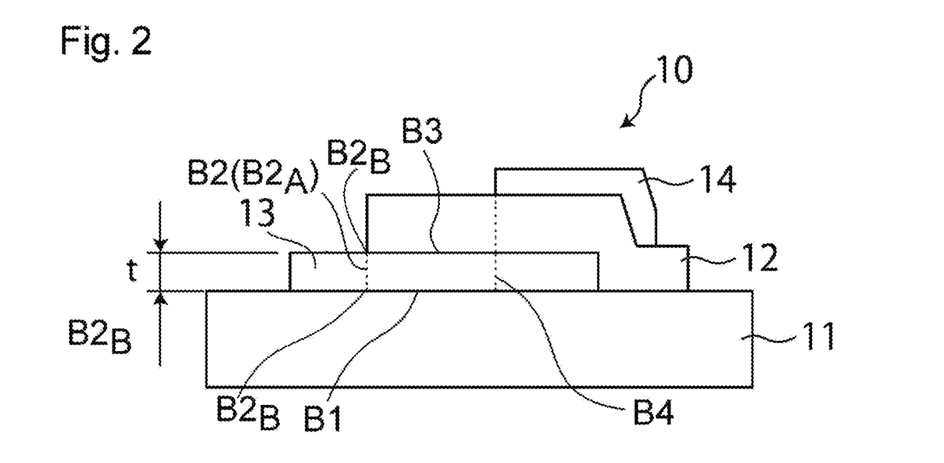
FIG. 2 is a cross-sectional view of the solid electrolyte assembly shown in FIG. 1, taken along line I-I.

A solid electrolyte assembly 10 shown in FIGS. 1 and 2 includes a substrate 11, a solid electrolyte 12 disposed on or above the substrate 11, and a first electrode 13 and a second electrode 14 that are arranged opposed to each other via the solid electrolyte 12. The solid electrolyte 12 has oxide ion conductivity.

The first electrode 13 is located under the solid electrolyte 12, is in contact with the substrate 11 and the solid electrolyte 12, and contains a gas permeable porous material. The entire first electrode 13 may be made of the gas permeable porous material.

In the plan view of the solid electrolyte assembly 10, the solid electrolyte 12 is shaped to extend from a peripheral edge of the second electrode 14.

In the plan view of the solid electrolyte assembly 10, the first electrode 13 and the second electrode 14 partially overlap each other.

In the plan view of the solid electrolyte assembly 10, the first electrode 13 and the solid electrolyte 12 partially overlap each other. The first electrode 13 has an L-shaped exposed portion 13C that is exposed to the outside from the solid electrolyte 12.

The first electrode 13 has an oxygen diffusion path that is formed overlapping the substrate 11 and the solid electrolyte 12. In the solid electrolyte assembly 10 of the present embodiment, a portion bounded by an interface B1 where the substrate 11 and the first electrode 13 are in direct contact with each other, an interface B2 between the exposed portion 13C and the solid electrolyte 12, an interface B3 where the first electrode 13 and the solid electrolyte 12 are in direct contact with each other, and an interface B4 of a portion where the first electrode 13 and the second electrode 14 overlap each other in the plan view of the solid electrolyte assembly 10 is defined as an oxygen diffusion path 13A. The interface B2 is a rectangular region demarcated by a pair of opposite vertical boundary lines B2A and a pair of opposite horizontal boundary lines B2B. The second electrode 14 located on the solid electrolyte 12 is in contact with the solid electrolyte 12. It is also possible that the second electrode 14 is extended to a position where it is in contact with the substrate 11.

The solid electrolyte assembly 10 of the present embodiment has only one oxygen diffusion path 13A. When Sr represents the smallest cross-sectional area that is a cross-sectional area of the oxygen diffusion path 13A at a location where the area of a cross section of the first electrode 13 taken perpendicularly to an oxygen diffusing direction is smallest in a portion of the oxygen diffusion path 13A where the oxygen diffusion path 13A overlaps the substrate 11 and the solid electrolyte 12 in the plan view of the solid electrolyte assembly 10, and Sp represents the area of a region where the first electrode 13 and the second electrode 14 overlap each other in a plan view of the solid electrolyte 12, Sr/Sp is preferably from $1.0 \times 10^{-7}$ to $6.9 \times 10^{-4}$, more preferably from $1.0 \times 10^{-6}$ to $6.0 \times 10^{-4}$, even more preferably from $5.0 \times 10^{-5}$ to $6.0 \times 10^{-4}$, and yet even more preferably from $1.0 \times 10^{-4}$ to $3.2 \times 10^{-4}$. When the above-described relationship is satisfied, a solid electrolyte assembly 10 that does not require a porous membrane to be provided separately from the electrodes, does not have a complex structure, and enables a reduction in production time can be obtained, and hence various electrochemical elements, for example, a limiting current type gas sensor, having the solid electrolyte assembly 10 can be obtained.

In particular, when the solid electrolyte assembly 10 is used in a limiting current type gas sensor, the dependence of the current value on an oxygen concentration shows linearity, and the limiting current occurs when a voltage of 1.0 V or more, or preferably 0.80 V or more, is applied at a low temperature of 600° C., preferably 550° C., or more preferably 500° C. Accordingly, oxygen concentration measurement at a low temperature and a low applied voltage is possible, and thus, deterioration of the limiting current type gas sensor caused by oxygen, in particular, deterioration of the solid electrolyte 12 caused by oxygen can be suppressed. That is to say, it is possible to provide a limiting current type gas sensor in which a porous membrane does not need to be provided separately from the electrodes, that does not have a complex structure and enables a reduction in production time, and in which the solid electrolyte 12 and hence the solid electrolyte assembly 10 are unlikely to deteriorate.

In the present invention, the "limiting current" is defined as follows. An applied voltage versus current value graph is obtained by plotting current values that are measured during a measurement in which the voltage applied to a solid electrolyte assembly is increased stepwise from 0 V to 1.4 V or more in increments of 10 mV or less, with the voltage at each step being kept for 0.1 seconds or longer, so that the potential of the upper electrode relative to the lower electrode is increased.

In this case, the amount of increase in the detected current per 30 mV is represented by $\Delta I$, the amount of increase (30 mV) in the applied voltage is represented by $\Delta V$, the value obtained from $\Delta I/\Delta V$ is defined as a first order differential quantity I' of the current value, the peak top of the first order differential quantity of the current value after 0.1 V is represented by I'B, and the voltage at that time is represented by VB. The largest voltage value that satisfies I'B/I'≥5 after VB is defined as VLC, the peak top of the first order differential quantity of the current value after VLC is defined as I'LC2, and it is defined that, when I'B/I'LC2>3 is satisfied, the limiting current occurs after VLC. The "peak top" refers to the maximum value of a Gaussian function when fitting using the Gaussian function is performed in a neighborhood of =0.1 V of the maximum value in a given interval.

Note that, in the case of a limiting current type gas sensor, in particular, a limiting current type oxygen gas sensor, the following reactions occur on the cathode side and the anode side.

While the value of Sr/Sp is preferably as described above, the value of Sr is preferably from 1 to 5000 $\mu m^2$, more preferably from 5 to 4000 $\mu m^2$, even more preferably from 10 to 3300 $\mu m^2$, and yet even more preferably from 20 to 400 $\mu m^2$, because this makes it easier to obtain a solid electrolyte assembly 10 that does not require a porous membrane to be provided separately from the electrodes, does not have a complex structure, and enables a reduction in production time.

For similar reasons, the value of Sp is preferably from $1\times10^3$ to $1\times10^9$ $\mu m^2$, more preferably from $5\times10^3$ to $1\times10^8$ $\mu m^2$, and even more preferably from $1\times10^4$ to $1\times10^7$ $\mu m^2$.

In the embodiment shown in FIGS. 1 and 2, the oxygen diffusion path 13A has a trapezoidal or rectangular cross-sectional shape when taken along a thickness direction of the first electrode 13, and the smallest cross-sectional area Sr is constant along a flow path of the oxygen diffusion path 13A. The shape of the cross section with the smallest cross-sectional area Sr can be determined using a known method based on the results of measurement performed with a stylus profilometer. The cross-sectional shape taken along the thickness direction of the first electrode 13 is preferably a trapezoid or rectangle in view of the ease of production when the first electrode 13 is composed of a material that will be described later. It is advantageous that the cross-sectional shape taken along the thickness direction of the solid electrolyte 12 is a trapezoid or rectangle, because, for example, even when the flow path of the oxygen diffusion path 13A is small, a large cross-sectional area can be maintained, and therefore, the oxygen diffusion resistance can be reduced. As a result, deterioration of the first electrode 13 caused by oxygen can be suppressed.

When the cross-sectional shape taken along the thickness direction of the first electrode 13 is a trapezoid, the smallest cross-sectional area Sr is obtained by dividing the trapezoid into four triangles and summing the areas of those triangles. When the cross-sectional shape is a rectangle, the smallest cross-sectional area Sr is a value obtained by subtracting the excess areas of two portions that can be approximated to triangles from the area of the surrounding rectangle.

In a plan view of the solid electrolyte 12, the first electrode 13 has a circular portion 13B connected to the oxygen diffusion path 13A. With this circular portion 13B, stress concentration in the stacked structure of the solid electrolyte 12 and the first electrode 13 can be alleviated, and thus, the effect of obtaining a solid electrolyte assembly 10 with fewer defects can be achieved. The circular portion 13B of the first electrode 13 may also be a portion having a polygonal shape, such as a quadrilateral, a pentagon, or a polygon with more sides than a pentagon, instead of a circular shape. In that case, in order to achieve the above-described effect, it is desirable to provide each corner portion with an arc-shaped curvature portion. The circular portion 13B of the first electrode 13 may have a circular shape, a polygonal shape, or an elliptical shape, or a combined shape of these shapes.

A portion 14A of the second electrode 14 that overlaps the circular portion 13B, which is a portion of the oxygen diffusion path 13A, of the first electrode 13 also has a circular shape in a plan view. This shape is preferable in terms of the ease of production of the first electrode 13 and the second electrode 14; however, the portion 14A of the second electrode 14 that overlaps the circular portion 13B of the first electrode 13 is not necessarily limited to a circular shape.

The solid electrolyte 12 has a rectangular shape in a plan view. This shape is preferable in terms of the ease of production. However, the shape of the solid electrolyte 12 in a plan view does not need to be a rectangle, and may also be a circle or an ellipse, or even a combination of these shapes.

The substrate 11 can be made of a general-purpose substrate material such as, for example, silicon (Si), silicon carbide (SiC), gallium nitride (GaN), aluminum nitride (AlN), sapphire, silicon oxide ($SiO_2$), silicon nitride ($Si_3N_4$), zirconium oxide ($ZrO_2$), or aluminum oxide ($Al_2O_3$). The substrate 11 is preferably made of silicon in view of its availability, ease of forming, and good chemical stability. The thickness of the substrate 11 is not limited to a specific value, but is in general from 50 nm to 1000 $\mu m$. When the thickness of the substrate 11 is within this range, it is possible to ensure good productivity while maintaining the rigidity of the substrate so that the substrate can support the solid electrolyte on the upper surface thereof.

There is no particular limitation on the type of the solid electrolyte 12. In view of the high oxide ion conductivity, the solid electrolyte 12 preferably contains a ceramic containing at least one selected from the group consisting of a composite oxide containing lanthanum and silicon, yttrium-stabilized zirconia, samarium-doped ceria, gadolinium-doped ceria, lanthanum gallate, and yttrium-doped bismuth oxide. These ceramics, or in other words, metal oxides are chemically stable and, in particular, are unlikely to react with oxygen and can thus suppress deterioration of the solid electrolyte 12 when the solid electrolyte assembly 10 is used in a limiting current type gas sensor as described above.

The thickness of the solid electrolyte 12 is not limited to a specific value, but is in general from 1.0 to 1000 nm. The thickness can be measured using a stylus profilometer or an electron microscope.

Preferably, the first electrode 13 contains a metal oxide, and the porosity $\rho_0$ of the first electrode 13 is from 1.0% to 50%, more preferably from 5.0% to 45%, even more preferably from 15.0% to 40%, and yet even more preferably from 20% to 30%. Setting the porosity $\rho_0$ of the first electrode 13 within this range makes it possible for the first electrode 13 to reliably diffuse oxygen molecules or conduct oxide ions into the oxygen diffusion path 13A. More specifically, if the porosity of the oxygen diffusion path 13A is low, the proportion of pores is low, and the amount of oxygen actually flowing through the oxygen diffusion path 13A is reduced, which means that the solid electrolyte assembly 10 cannot function as a limiting current type gas sensor, for example. However, this problem can be avoided by setting the porosity $\rho_0$ of the first electrode 13 within the above-described range. Ceramics such as those listed above as examples for the solid electrolyte 12 can be used as the metal oxide.

In order for the first electrode 13 to satisfy the above-described porosity $\rho_0$, the metal oxide content is preferably from 1.0 to 60 vol %, and more preferably from 2.0 to 55 vol %.

In the present embodiment, when the porosity of the oxygen diffusion path 13A is $\rho_0$ (%), $S_r \times \rho_0/(Sp \times 100)$ is preferably from $1.0 \times 10^{-8}$ to $1.9 \times 10^{-4}$, more preferably from $2.0 \times 10^{-7}$ to $1.8 \times 10^{-4}$, even more preferably from $1.0 \times 10^{-5}$ to $1.5 \times 10^{-4}$, and yet even more preferably from $1.5 \times 10^{-5}$ to $8.0 \times 10^{-5}$. With this configuration, the first electrode 13 can reliably allow oxygen to flow through the oxygen diffusion path 13A. More specifically, if the porosity of the oxygen diffusion path 13A is excessively low, the proportion of pores is low, and the amount of oxygen actually flowing through the oxygen diffusion path 13A is reduced, which means that the solid electrolyte assembly 10 cannot accurately function as a limiting current type gas sensor, for example. However, this problem can be avoided by setting the porosity $\rho_0$ of the oxygen diffusion path 13A of the first electrode 13 within the above-described range.

For similar reasons, the average pore size of the first electrode 13 is preferably from 5 to 200 nm, and more preferably from 15 to 150 nm or from 20 to 100 nm. The average pore size can be obtained by observing the upper surface of the first electrode 13 by scanning electron microscopy, and performing calculation using a piece of image analysis software Image-Pro 10 manufactured by Media Cybernetics, Inc. For example, at a magnification of 50000 times, a 2.5 μm×1.8 μm region is specified, and after contrast enhancement and drawing of lines along the contours are performed as necessary, at least three void portions and at least three electrode portions are selected using the machine learning function to binarize the luminance. The average pore size is obtained by selecting "Diameter, Average" as the measurement item and identifying pores by performing image analysis. The porosity is obtained by performing a similar procedure to that of the average pore size, but selecting "Area Ratio (%)" as the measurement item.

Preferably, the first electrode 13 contains a noble metal element composed of at least one of platinum group elements (platinum (Pt), palladium (Pd), rhodium (Rh), ruthenium (Ru), iridium (Ir), and osmium (Os)) and gold (Au) as well as alloys containing these elements. In particular, the first electrode 13 is preferably a porous composite of the above-described metal oxide with the above-described noble metal element, in particular, cermet. In this case, the heat resistance of the first electrode 13 is improved, and densification during heating is less likely to occur, so that the effect of making it easier to maintain voids can be achieved. Examples of the aforementioned alloys include general-purpose alloys such as Pt—Rh, Au—Pt, and Au—Pd alloys.

The thickness of the first electrode 13 is preferably from 10 to 2000 nm, and more preferably from 20 to 1600 nm or from 30 to 1200 nm. With this configuration, a first electrode 13 that is large enough to form the oxygen diffusion path 13A can be realized. The thickness can be measured using a stylus profilometer, an electron microscope, or an optical three-dimensional measuring device.

The second electrode 14 can be made of a general-purpose electrode material, and, for example, may be made of a metal electrode or graphite. Alternatively, as with the first electrode 13, the second electrode 14 may be a porous composite of a metal oxide with a metal, in particular, cermet.

The thickness of the second electrode 14 is preferably from 10 to 1000 nm, and more preferably from 20 to 700 nm. The thickness can be measured using a stylus profilometer, an electron microscope, or an optical three-dimensional measuring device.

Figure 3:
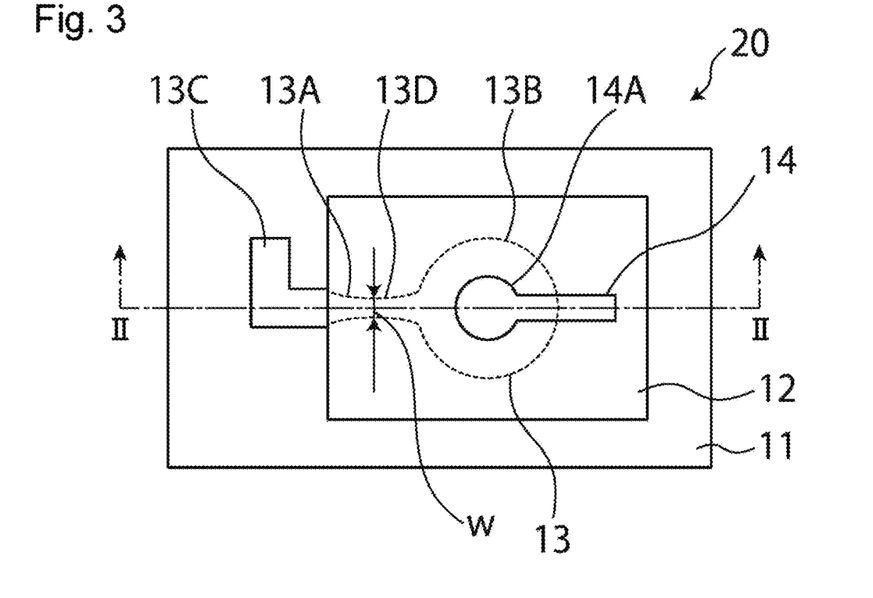
FIG. 3 is a plan view showing the structure of another embodiment of the solid electrolyte assembly of the present invention.
Figure 4:
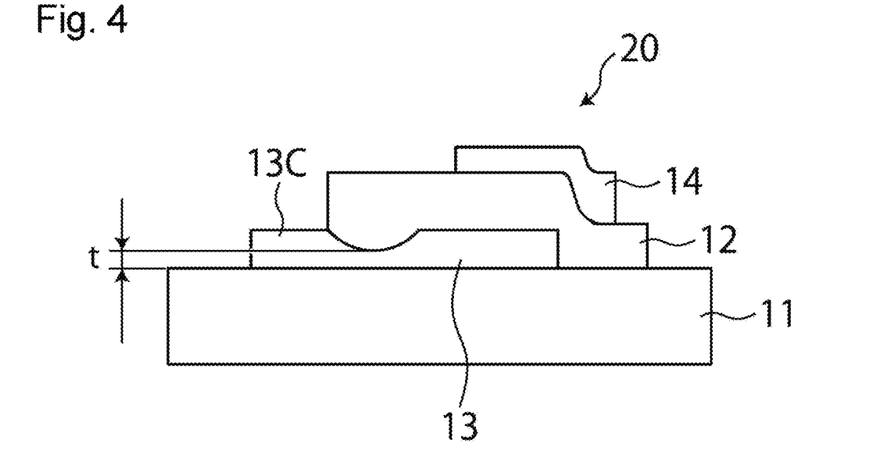
FIG. 4 is a cross-sectional view of the solid electrolyte assembly shown in FIG. 3, taken along line II-II.

FIG. 3 is a plan view showing the structure of another embodiment of the solid electrolyte assembly of the present invention, and FIG. 4 is a cross-sectional view of the solid electrolyte assembly shown in FIG. 3, taken along line II-II. In FIGS. 3 and 4, constituent elements that are similar to or the same as those in FIGS. 1 and 2 are denoted by the same reference symbols.

A solid electrolyte assembly 20 of the present embodiment is the same as the solid electrolyte assembly 10 of the previous embodiment in that it has only one oxygen diffusion path, but differs from the solid electrolyte assembly 10 of the previous embodiment in that a narrowed portion 13D is formed in a portion of the oxygen diffusion path 13A of the first electrode 13. Accordingly, the smallest cross-sectional area Sr of the oxygen diffusion path 13A needs to be calculated in the narrowed portion 13D. The L-shaped exposed portion 13C of the first electrode 13 is exposed to the outside from the solid electrolyte 12.

In the present embodiment as well, when Sp represents the area of a region where the first electrode 13 and the second electrode 14 overlap each other, Sr/Sp is preferably from $1.0 \times 10^{-7}$ to $6.9 \times 10^{-4}$, and more preferably from $1.0 \times 10^{-6}$ to $6.0 \times 10^{-4}$. When the above-described relationship is satisfied, a solid electrolyte assembly 20 that does not require a porous membrane to be provided separately from the electrodes, does not have a complex structure, and enables a reduction in production time can be obtained, and hence various electrochemical elements, for example, a limiting current type gas sensor, having the solid electrolyte assembly 20 can be obtained.

Other features and advantages of the present embodiment are similar to those of the embodiment related to FIGS. 1 and 2, and therefore, descriptions thereof will be omitted.

Figure 5:
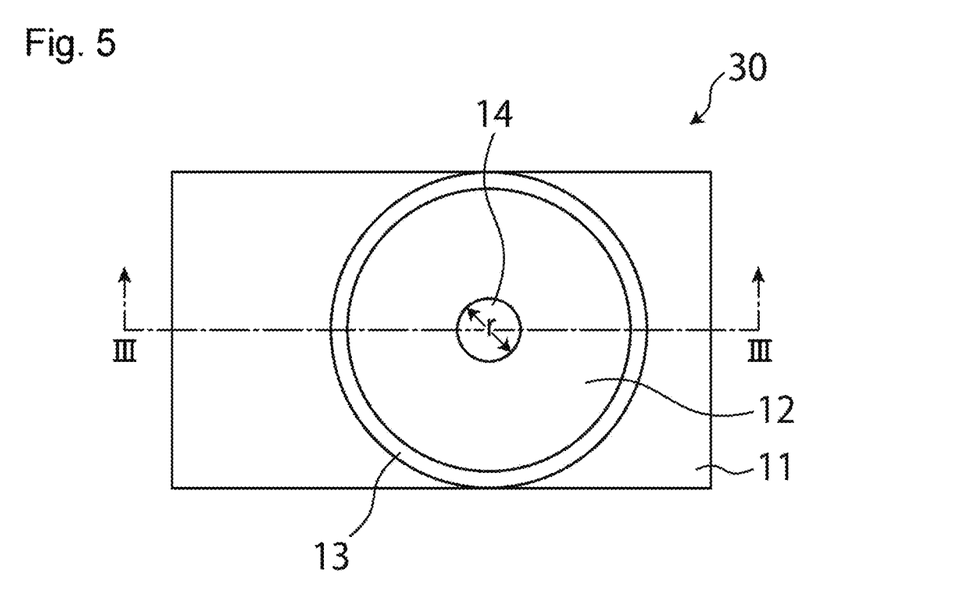
FIG. 5 is a plan view showing the structure of yet another embodiment of the solid electrolyte assembly of the present invention.
Figure 6:
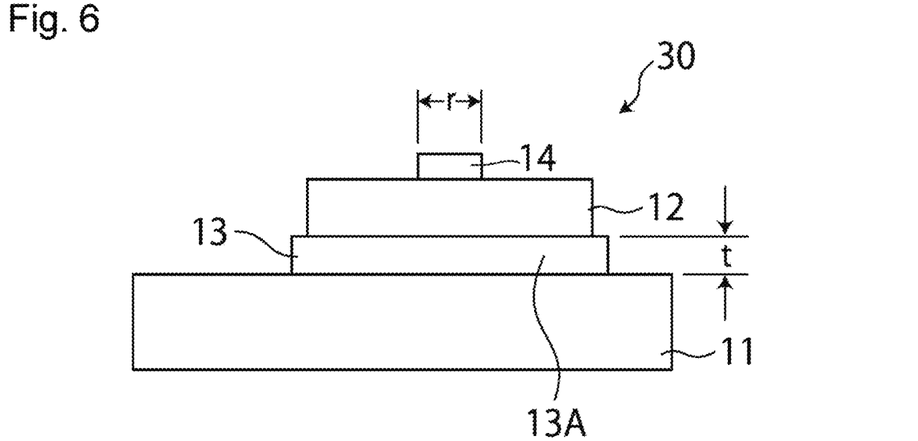
FIG. 6 is a cross-sectional view of the solid electrolyte assembly shown in FIG. 5, taken along line III-III.

FIG. 5 is a plan view showing the structure of yet another embodiment of the solid electrolyte assembly of the present invention, and FIG. 6 is a cross-sectional view of the solid electrolyte assembly shown in FIG. 5, taken along line III-III. In FIGS. 5 and 6, constituent elements that are similar to or the same as those in FIGS. 1 to 4 are denoted by the same reference numerals.

In a solid electrolyte assembly 30 of the present embodiment, all of the solid electrolyte 12, the first electrode 13, and the second electrode 14 are disk-shaped. As shown in FIG. 6, which shows a cross section of the solid electrolyte assembly 30, the solid electrolyte assembly 30 is the same as the solid electrolyte assembly 10 of the foregoing embodiments in that it has only one oxygen diffusion path, but the solid electrolyte assembly 30 of the present embodiment differs from the solid electrolyte assembly 10 of the foregoing embodiments in that there is no portion where the substrate 11 and the solid electrolyte 12 are in direct contact with each other, and a circular portion where the first electrode 13 and the solid electrolyte 12 overlap each other in a plan view of the solid electrolyte 12 constitutes the oxygen diffusion path 13A of the first electrode 13. Accordingly, in the present embodiment, the smallest cross-sectional area Sr can be expressed as $\pi r \times t$, using the diameter r of the second electrode 14 and the thickness t of the first electrode 13, because the length of the boundary line of a region where the first electrode 13 and the second electrode 14 overlap each other in the plan view of the solid electrolyte 12 is equal to the circumference of the second electrode 14. The boundary line Ær is calculated, using a microscope, as the circumference of a circle that passes through three points on the boundary line. The thickness t is measured using a stylus profilometer.

In the present embodiment as well, when Sp represents the area of a region where the first electrode 13 and the second electrode 14 overlap each other, Sr/Sp is preferably from $1.0 \times 10^{-7}$ to $6.9 \times 10^{-4}$, and more preferably from $1.0 \times 10^{-6}$ to $6.0 \times 10^{-4}$. When the above-described relationship is satisfied, a solid electrolyte assembly 30 that does not require a porous membrane to be provided separately from the electrodes, does not have a complex structure, and enables a reduction in production time can be obtained, and hence various electrochemical elements, for example, a limiting current type gas sensor, having the solid electrolyte assembly 30 can be obtained. Sp is calculated, using a microscope, as the area of a circle that passes through three points on the boundary line of the region where the first electrode 13 and the second electrode 14 overlap each other.

Other features and advantages of the present embodiment are similar to those of the embodiment related to FIGS. 1 and 2, and therefore, descriptions thereof will be omitted.

Figure 7:
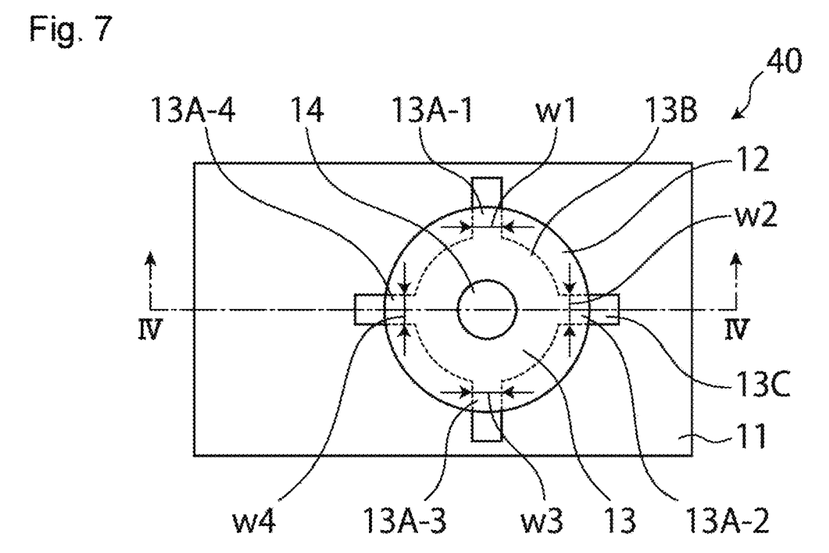
FIG. 7 is a plan view showing the structure of yet another embodiment of the solid electrolyte assembly of the present invention.
Figure 8:
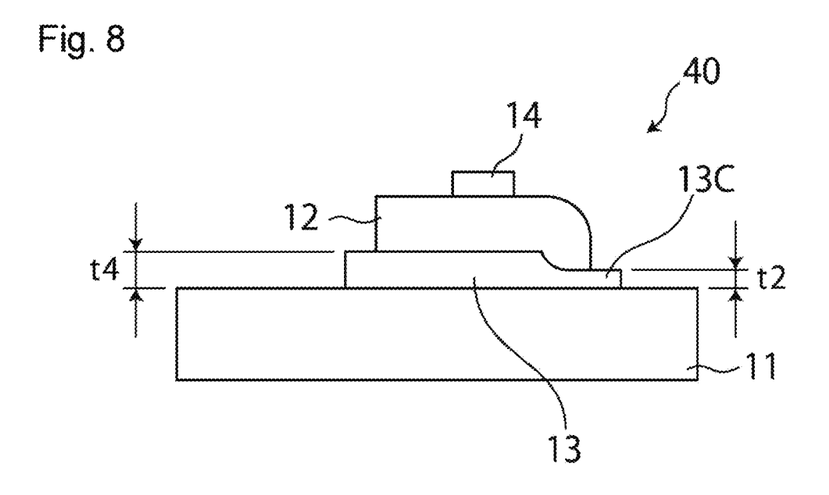
FIG. 8 is a cross-sectional view of the solid electrolyte assembly shown in FIG. 7, taken along line IV-IV.

FIG. 7 is a plan view showing the structure of yet another embodiment of the solid electrolyte assembly of the present invention, and FIG. 8 is a cross-sectional view of the solid electrolyte assembly shown in FIG. 7, taken along line IV-IV. In FIGS. 7 and 8, constituent elements that are similar to or the same as those in FIGS. 1 to 6 are denoted by the same reference numerals.

A solid electrolyte assembly 40 of the present embodiment differs from the solid electrolyte assembly 10 of the above-described embodiment in that the first electrode 13 has a plurality of oxygen diffusion paths, or specifically, four oxygen diffusion paths 13A-1, 13A-2, 13A-3, and 13A-4. Accordingly, the smallest cross-sectional area Sr that is a cross-sectional area of the oxygen diffusion path 13A at a location where the area of a cross section taken along the thickness direction of the solid electrolyte 12 is smallest is expressed as the sum total ΣSr of the smallest cross-sectional areas Sr1, Sr2, Sr3, and Sr4 of the four oxygen diffusion paths 13A-1, 13A-2, 13A-3, and 13A-4, respectively.

In this case, each oxygen diffusion path has a trapezoidal or rectangular cross-sectional shape when taken along the thickness direction at a location where the oxygen diffusion path has the smallest cross-sectional area. In the case where the cross-sectional shape taken along the thickness direction is a rectangle, the smallest cross-sectional area Sr1 of the oxygen diffusion path 13A-1 can be expressed as width w1×thickness t1. Similarly, the smallest cross-sectional area Sr2 of the oxygen diffusion path 13A-2 can be expressed as width w2×thickness t2, the smallest cross-sectional area Sr3 of the oxygen diffusion path 13A-3 can be expressed as width w3×thickness t3, and the smallest cross-sectional area Sr4 of the oxygen diffusion path 13A-4 can be expressed as width w4×thickness t4. That is to say, the smallest cross-sectional area ΣSr of the present embodiment is Sr1+Sr2+Sr3+Sr4, which is the sum total of the smallest cross-sectional areas of the four respective oxygen diffusion paths. In the case where the cross-sectional shape taken along the thickness direction is a trapezoid as well, the smallest cross-sectional area ΣSr can be obtained as the sum total of the smallest cross-sectional areas, Sr1+Sr2+Sr3+Sr4.

In the present embodiment, when Sp represents the area of a region where the first electrode 13 and the second electrode 14 overlap each other, ΣSr/Sp needs to be from $1.0 \times 10^{-7}$ to $6.9 \times 10^{-4}$, and is preferably $1.0 \times 10^{-6}$ to $6.0 \times 10^{-4}$. When the above-described relationship is satisfied, a solid electrolyte assembly 40 that does not require a porous membrane to be provided separately from the electrodes, does not have a complex structure, and enables a reduction in production time can be obtained, and hence various electrochemical elements, for example, a limiting current type gas sensor, having the solid electrolyte assembly 40 can be obtained.

In the present embodiment, when the porosity of the oxygen diffusion paths is $\rho_O$ (%), $\Sigma Sr \times \rho_O/(Sp \times 100)$ is preferably from $1.0 \times 10^{-8}$ to $1.9 \times 10^{-4}$, and more preferably from $2.0 \times 10^{-7}$ to $1.8 \times 10^{-4}$. With this configuration, the first electrode 13 can reliably allow oxygen to flow through the oxygen diffusion paths 13A-1, 13A-2, 13A-3, and 13A-4. Other features and advantages of the present embodiment that are realized when the above-described conditions are satisfied are similar to those of the embodiment related to FIGS. 1 and 2, and therefore, descriptions thereof will be omitted.

Although the first electrode 13 has four oxygen diffusion paths in the present embodiment, the present invention can be applied to all modes in which the number of oxygen diffusion paths is two or more. In this case, the effects of the present embodiment can be achieved when ΣSr/Sp is from $1.0 \times 10^{-7}$ to $6.9 \times 10^{-4}$, where ΣSr is the sum total of the smallest cross-sectional areas Sr of the two or more oxygen diffusion paths.

Although the exposed portion 13C of the first electrode 13, which is exposed to the outside from the solid electrolyte 12, is I-shaped in the present embodiment, the shape of the exposed portion 13C is not limited to a specific shape, and may be any shape such as an L-shape as in the case of the embodiment shown in FIGS. 1 and 2.

Other features and advantages of the present embodiment are similar to those of the embodiment related to FIGS. 1 and 2, and therefore, their descriptions will be omitted.

Figure 9:
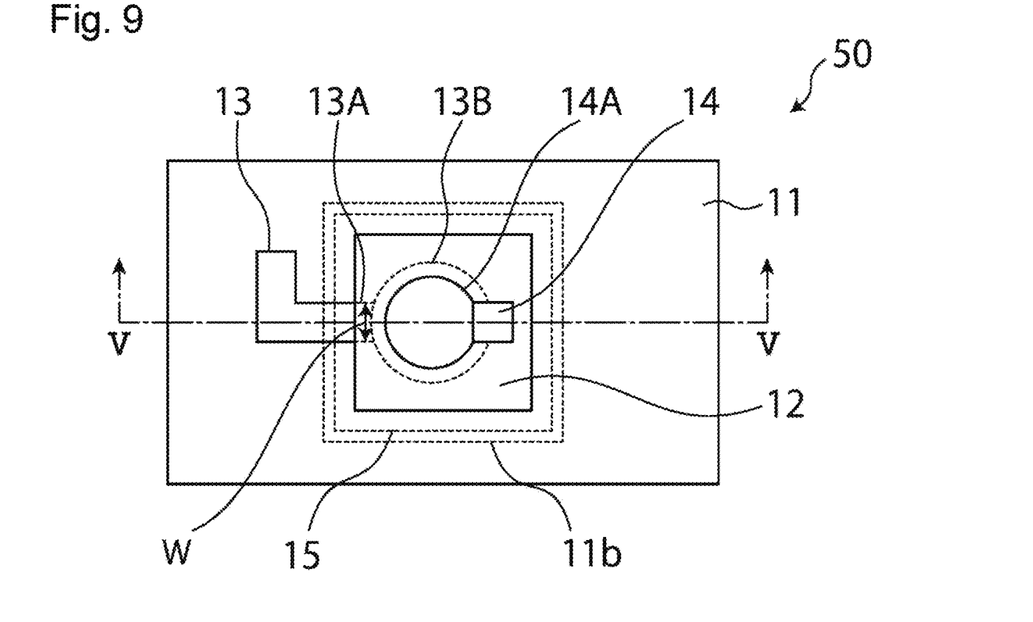
FIG. 9 is a plan view showing the structure of yet another embodiment of the solid electrolyte assembly of the present invention.
Figure 10:
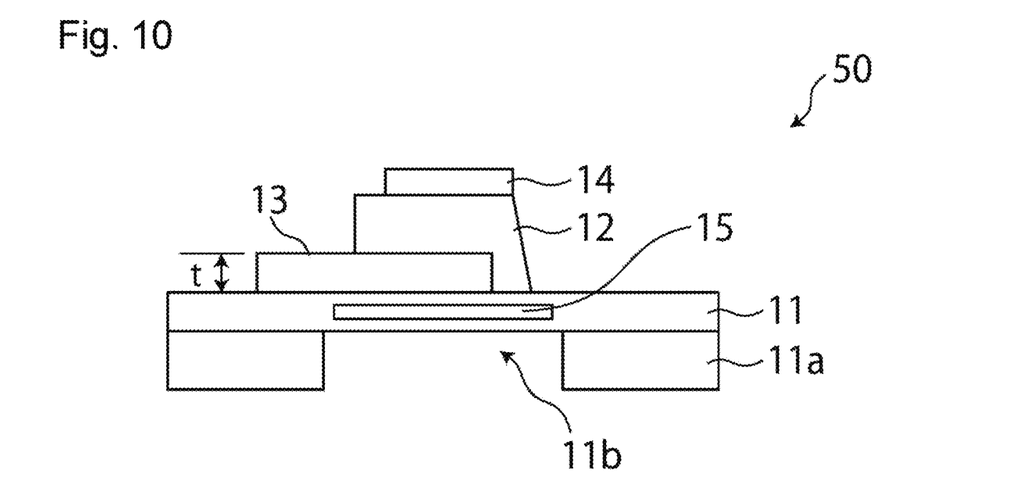
FIG. 10 is a cross-sectional view of the solid electrolyte assembly shown in FIG. 9, taken along line V-V.
Figure 11:
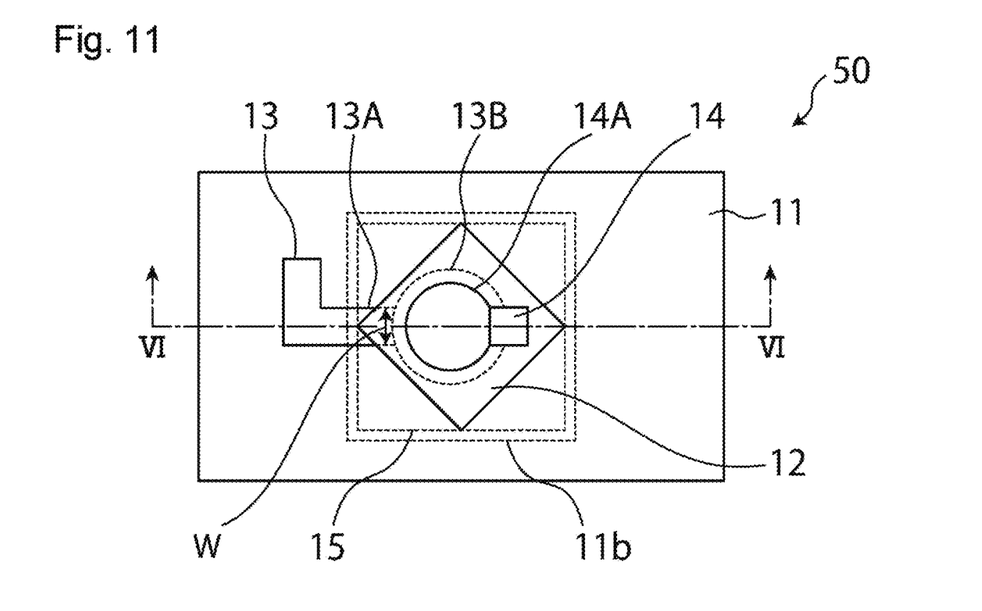
FIG. 11 is a plan view showing the structure of yet another embodiment of the solid electrolyte assembly of the present invention.
Figure 12:
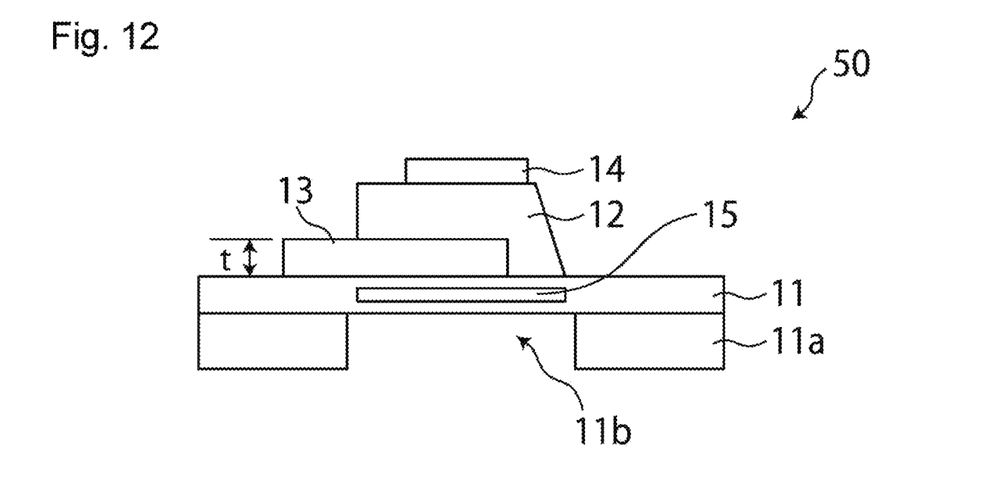
FIG. 12 is a cross-sectional view of the solid electrolyte assembly shown in FIG. 11, taken along line VI-VI.
Figure 13:
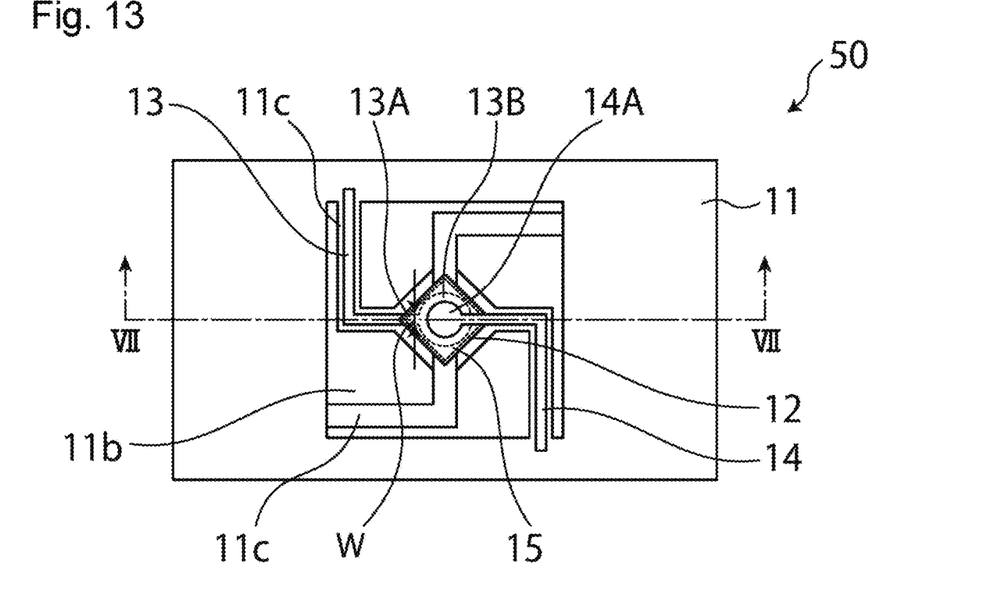
FIG. 13 is a plan view showing the structure of yet another embodiment of the solid electrolyte assembly of the present invention.
Figure 14:
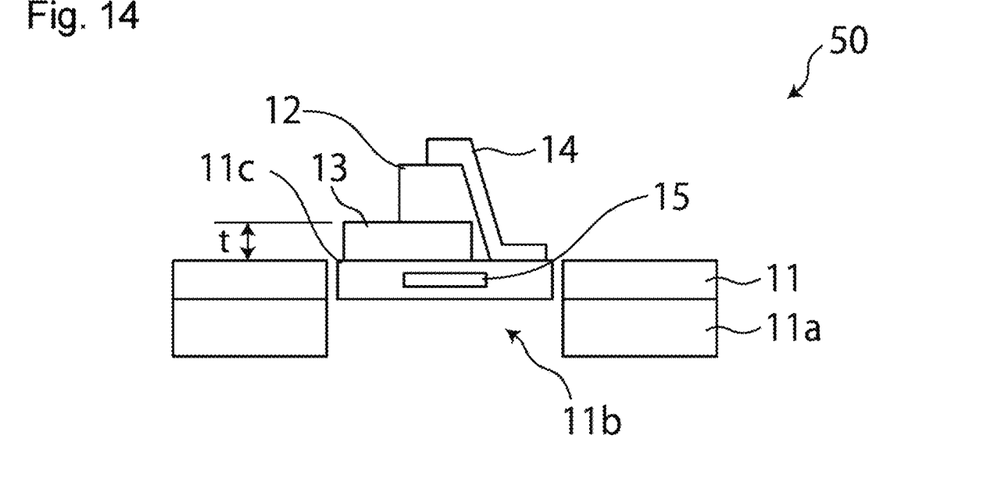
FIG. 14 is a cross-sectional view of the solid electrolyte assembly shown in FIG. 13, taken along line VII-VII.

FIGS. 9, 11, and 13 are plan views showing the structures of yet other embodiments of the solid electrolyte assembly of the present invention; FIG. 10 is a cross-sectional view of the solid electrolyte assembly shown in FIG. 9, taken along line V-V; FIG. 12 is a cross-sectional view of the solid electrolyte assembly shown in FIG. 11, taken along line VI-VI; and FIG. 14 is a cross-sectional view of the solid electrolyte assembly shown in FIG. 13, taken along line VII-VII. In FIGS. 9 to 14, constituent elements that are similar to or the same as those in FIGS. 1 to 8 are denoted by the same reference numerals.

Solid electrolyte assemblies 50 of the embodiments shown in FIGS. 9 to 14 are similar to the solid electrolyte assembly 10 of the embodiment shown in FIG. 1 and the like in that it has only one oxygen diffusion path, but differs from the solid electrolyte assembly 10 of the above-described embodiment in that a substrate 11 incorporating a heater 15 is formed on a support 11a, and a cavity 11b is provided under the solid electrolyte 12, the cavity 11b having a larger area than the solid electrolyte 12 in a plan view. The support 11a may be integrally molded with the substrate 11, or may be a separate member and be combined with the substrate 11.

Of these embodiments, the embodiment shown in FIGS. 13 and 14 differs from the embodiments shown in FIGS. 9 to 12 in that, in a plan view of the solid electrolyte assembly 50, a through portion 11c is provided in a partial region of the substrate 11 at the periphery of a region where the solid electrolyte 12 and the second electrode 14 are located, and a portion of the first electrode 13 is located on the through portion 11c to thereby suppress heat conduction.

In the embodiments shown in FIGS. 9 to 14 as well, when Sp represents the area of a region where the first electrode 13 and the second electrode 14 overlap each other, Sr/Sp is preferably from $1.0 \times 10^{-7}$ to $6.9 \times 10^{-4}$, and more preferably from $1.0 \times 10^{-6}$ to $6.0 \times 10^{-4}$. When the above-described relationship is satisfied, a solid electrolyte assembly 50 that does not require a porous membrane to be provided separately from the electrodes, does not have a complex structure, and enables a reduction in production time can be obtained, and hence various electrochemical elements, for example, a limiting current type gas sensor, having the solid electrolyte assembly 50 can be obtained.

In the case of the embodiments shown in FIGS. 9 to 14, it is preferable that the substrate 11 is made of silicon oxide ($SiO_2$) or silicon nitride ($Si_3N_4$), in view of the ease of forming, the ease of stress control, and the low heat conductivity. The substrate 11 is formed using a chemical vapor deposition (CVD) method or a reactive sputtering method, and, from the viewpoint of suppressing heat conduction, the thickness of the substrate 11 is preferably from 0.05 to 30 µm.

In the embodiments shown in FIGS. 9 to 14, materials such as platinum and silicon are suitably used for the heater 15. In view of productivity, it is preferable that the heater 15 is formed through sputtering.

When the substrate 11 incorporating the heater 15 is provided on the support 11a having the cavity 11b as in the embodiments shown in FIGS. 9 to 14, heat dissipation from the heater 15 to the support 11a can be suppressed, and thus, the solid electrolyte assemblies 50 can be efficiently heated. Accordingly, the limiting current can occur in the solid electrolyte assemblies 50 with low power consumption. In particular, in the embodiment shown in FIGS. 13 and 14, since the through portion 11c is provided in the partial region, the limiting current can be reached in the solid electrolyte assembly 50 with even lower power consumption.

In the embodiments shown in FIGS. 9 to 14, the support 11a can be made of a general-purpose substrate material such as, for example, silicon (Si), silicon carbide (SiC), gallium nitride (GaN), aluminum nitride (AlN), sapphire, silicon oxide ($SiO_2$), silicon nitride ($Si_3N_4$), zirconium oxide ($ZrO_2$), or aluminum oxide ($Al_2O_3$). The support 11a is preferably made of silicon in view of its availability and good chemical stability.

Other features and advantages of the embodiments shown in FIGS. 9 to 14 are similar to those of the embodiment related to FIGS. 1 and 2, and therefore, descriptions thereof will be omitted.

Next, a preferred method for producing the solid electrolyte assembly of the present invention will be described using the solid electrolyte assembly 10 shown in FIGS. 1 and 2 as an example.

First, the first electrode 13 is formed on the substrate 11. In the step of forming the first electrode 13, the substrate 11 is prepared, and the first electrode 13 is formed on one side of the substrate 11. Various thin-film forming methods can be used to form the first electrode 13. Specifically, the first electrode 13 can be formed using physical vapor deposition (PVD) methods such as vapor deposition, sputtering, and ion plating, or chemical vapor deposition (CVD) methods. Among these various methods, it is preferable to use sputtering because this method can facilitate the formation of the first electrode 13 with a co-continuous structure in which the ion-conductive metal oxide is bonded by platinum or the like, and is excellent in terms of mass production.

When forming the first electrode 13 through sputtering, a target of the platinum or the like and a target of the ion-conductive metal oxide can be used to form the first electrode 13 containing the platinum or the like and the ion-conductive metal oxide. Furthermore, the porosity of the first electrode 13 to be formed can be controlled by adjusting the gas pressure during sputtering; for example, the porosity of the first electrode 13 can be increased by increasing the gas pressure. The proportions of the platinum or the like and the ion-conductive metal oxide, respectively, in the first electrode 13 can be adjusted by appropriately setting the power that is supplied to the targets when performing the sputtering.

After the first electrode 13 is formed, the step of forming the solid electrolyte 12 is performed. The solid electrolyte 12 is formed on one side of the first electrode 13 that is not opposed to the substrate 11, of the two sides of the first electrode 13. As with the formation of the first electrode 13, various thin-film forming methods can be used to form the solid electrolyte 12. Among the thin-film forming methods, it is preferable to use sputtering because this method can facilitate the formation of the solid electrolyte 12 with a desired composition.

A step of firing the first electrode 13 may be performed after the first electrode 13 is formed and before the solid electrolyte 12 is formed.

The step of firing the first electrode 13 is performed in order to reliably produce a co-continuous structure in which the ion-conductive metal oxide is bonded by the platinum or the like, that is, cermet in the first electrode 13. From the viewpoint of reliably producing the co-continuous structure, the firing temperature is preferably from 300° C. to 1300° C., more preferably from 500° C. to 1000° C., and even more preferably from 600° C. to 950° C.

From a similar point of view, the firing time at the above-mentioned firing temperature is preferably from 1 minute to 10 hours, more preferably from 3 minutes to 5 hours, and even more preferably from 10 minutes to 3 hours.

There is no limitation on the firing atmosphere, and it may be an oxygen-containing atmosphere or a reducing atmosphere.

Through the step of firing the electrode layer, when the electrode layer is a layer containing, for example, samarium-doped ceria (hereinafter also referred to as "SDC") and the platinum or the like, a layer constituted only by SDC is formed on the side of the substrate 11 that is opposed to the electrode layer. Alternatively, when the substrate 11 is made of silicon, an $SiO_2$ layer is formed on the side of the substrate 11 that is opposed to the electrode layer.

As with the formation of the first electrode 13, various thin-film forming methods can be used to form the solid electrolyte 12. Specifically, the solid electrolyte 12 can be formed using physical vapor deposition (PVD) methods such as vapor deposition, sputtering, and ion plating, or chemical vapor deposition (CVD) methods. It is preferable to use sputtering because this method is excellent in terms of mass production.

It is preferable to perform a step of firing the formed solid electrolyte 12. The step of firing the solid electrolyte 12 can be performed in a similar manner to that of the above-described step of firing the first electrode 13.

In this production method, the above-described firing step may also be performed after the solid electrolyte 12 is formed. Note that the firing step in this case is performed mainly on the solid electrolyte 12 and not on the first electrode 13. Accordingly, in addition to the step of mainly firing the solid electrolyte 12, the step of firing the first electrode 13 can be performed after the completion of the step of forming the first electrode 13 and before the step of forming the solid electrolyte 12. It will be appreciated that, if the first electrode 13 is also sufficiently fired through the step of mainly firing the solid electrolyte 12, an additional step of firing the first electrode 13 does not have to be performed after the completion of the step of forming the first electrode 13 and before the step of forming the solid electrolyte 12.

After the solid electrolyte 12 is formed, the second electrode 14 is formed using a method similar to that of the first electrode 13. In this case, it is possible to perform a firing step after the completion of the step of forming the solid electrolyte 12, and then perform a firing step again after the completion of the step of forming the second electrode 14. From the viewpoint of simplifying the processes, it is preferable that a firing step is not performed after the completion of the step of forming the solid electrolyte 12, and a firing step is performed after the completion of the step of forming the solid electrolyte 12 after the completion of the step of forming the second electrode 14.

Although a method for producing the solid electrolyte assembly 10 shown in FIGS. 1 and 2 has been described above, the solid electrolyte assembly 20 shown in FIGS. 3 and 4, the solid electrolyte assembly 30 shown in FIGS. 5 and 6, and the solid electrolyte assembly 40 shown in FIGS. 7 and 8 can be produced using a similar method, except that the shapes of masks that are used to form the solid electrolyte 12, the first electrode 13, and the second electrode 14 are changed.

Although the present invention has been described above based preferred embodiments thereof, the present invention is not limited to the foregoing embodiments.

With regard to the foregoing embodiments, the present invention further discloses a solid electrolyte assembly, an electrochemical element, and a limiting current type gas sensor below.

(1) A solid electrolyte assembly comprising:
a substrate;
a solid electrolyte disposed on or above the substrate; and
a first electrode and a second electrode that are arranged opposed to each other via the solid electrolyte,
wherein the solid electrolyte has oxide ion conductivity,
at least a portion of the first electrode is located between the substrate and the solid electrolyte and contains a porous material,
in a plan view of the solid electrolyte assembly, the first electrode has only one oxygen diffusion path that is formed overlapping the substrate and the solid electrolyte, and
the solid electrolyte assembly satisfies the condition that Sr/Sp is from $1.0\times10^{-7}$ to $6.9\times10^{-4}$.
wherein Sr represents a smallest cross-sectional area that is a cross-sectional area of the oxygen diffusion path at a location where an area of a cross section of the first electrode taken perpendicularly to an oxygen diffusing direction is smallest in a portion of the oxygen diffusion path where the oxygen diffusion path overlaps the substrate and the solid electrolyte in the plan view of the solid electrolyte assembly, and
Sp represents an area of a region where the first electrode and the second electrode overlap each other in a plan view of the solid electrolyte.

(2) A solid electrolyte assembly comprising:
a substrate;
a solid electrolyte disposed on or above the substrate; and
a first electrode and a second electrode that are arranged opposed to each other via the solid electrolyte,
wherein the solid electrolyte has oxide ion conductivity,
at least a portion of the first electrode is located between the substrate and the solid electrolyte and contains a porous material,
in a plan view of the solid electrolyte assembly, the first electrode has a plurality of oxygen diffusion paths that are formed overlapping the substrate and the solid electrolyte, and
the solid electrolyte assembly satisfies the condition that $\Sigma$Sr/Sp is from $1.0\times10^{-7}$ to $6.9\times10^{-4}$,
wherein Sr represents a smallest cross-sectional area that is a cross-sectional area of each oxygen diffusion path at a location where an area of a cross section of the first electrode taken perpendicularly to an oxygen diffusing direction is smallest in a portion of the oxygen diffusion path where the oxygen diffusion path overlaps the substrate and the solid electrolyte in the plan view of the solid electrolyte assembly, and $\Sigma$Sr represents a sum total of the smallest cross-sectional areas Sr of the respective oxygen diffusion paths, and
Sp represents an area of a region where the first electrode and the second electrode overlap each other in a plan view of the solid electrolyte.

(3) The solid electrolyte assembly as set forth in clause (1) or (2), wherein the oxygen diffusion path has a trapezoidal or rectangular cross-sectional shape when taken along a thickness direction of the oxygen diffusion path at a location where the oxygen diffusion path has the smallest cross-sectional area Sr.

(4) The solid electrolyte assembly as set forth in any one of clauses (1) to (3), wherein, in the plan view of the solid electrolyte, the first electrode has a shape including a circular portion or a polygonal portion.

(5) The solid electrolyte assembly as set forth in any one of clauses (1) to (4), wherein the first electrode contains a metal oxide, and a porosity $\rho_0$ of the first electrode is from 1.0% to 50%.

(6) The solid electrolyte assembly as set forth in any one of clauses (1) to (5), wherein a proportion of the metal oxide in the first electrode is from 1.0 to 60 vol %.

(7) The solid electrolyte assembly as set forth in any one of clauses (1) to (6), wherein the first electrode is in contact with the substrate made of silicon.

(8) The solid electrolyte assembly as set forth in any one of clauses (1) to (7), wherein a thickness of the first electrode is from 10 to 2000 nm.

(9) The solid electrolyte assembly as set forth in any one of clauses (1) to (8), wherein an average pore size of the first electrode is from 5 to 200 nm.

(10) The solid electrolyte assembly as set forth in any one of clauses (1) to (9), wherein the first electrode contains at least one of platinum group elements, gold, and alloys containing these elements.

(11) The solid electrolyte assembly as set forth in any one of clauses (1) to (10), wherein the solid electrolyte is made of a ceramic containing at least one selected from the group consisting of a composite oxide containing lanthanum and silicon, yttrium-stabilized zirconia, samarium-doped ceria, gadolinium-doped ceria, lanthanum gallate, and yttrium-doped bismuth oxide.

(12) An electrochemical element including the solid electrolyte assembly as set forth in any one of clauses (1) to (11).

(13) A limiting current type gas sensor including the electrochemical element as set forth in clause (12), wherein a relationship between a current value and an oxygen concentration is linear.

(14) A limiting current type gas sensor, wherein a limiting current occurs when a voltage of 1.0 V or more is applied to the electrochemical element as set forth in clause (12) at 600° C.

EXAMPLES

Example 1

In the present example, a solid electrolyte assembly 10 shown in FIGS. 1 and 2 was produced.

A silicon substrate 11 with a crystal orientation of <100> and a thickness of 300 μm was prepared. A first electrode 13 with a thickness of 0.850 μm was formed on one side of the substrate 11 through sputtering. Note that the shape of the first electrode 13 was controlled to w=1600 μm using a stencil mask. As targets in the sputtering, a platinum target with a size of 2 inches and a $(La_{0.75}Y_{0.25})_{9.33}Si_6O_{26}$ (YLSO) target with a size of 4 inches were used. The film was formed using co-sputtering in which power was supplied to the two targets simultaneously. The DC sputtering was performed for the platinum, and the RF sputtering was performed for the YLSO. The flow rate of argon gas was set to 50 sccm, and the argon pressure was set to 4 Pa. The power was 90 W and 200 W, respectively, and the sputtering was performed at room temperature. The first electrode 13 contained YLSO in an amount of 15 vol % and platinum in an amount of 85 vol %.

Next, a solid electrolyte 12 layer with a thickness of 300 nm was formed on the first electrode 13 through RF sputtering. As a target in the sputtering, an YLSO target with a size of 4 inches was used. The flow rate of argon gas was set to 50 sccm, and the argon pressure was set to 0.5 Pa. The power was 200 W, and the sputtering was performed at room temperature. Furthermore, a second electrode 14 made of the same porous composite as the first electrode 13 was formed on the solid electrolyte 12 using a method similar to the method for producing the first electrode 13.

The oxygen diffusion path 13A of the first electrode 13 had a trapezoidal cross-sectional shape when taken along the thickness direction of the first electrode 13, and the smallest cross-sectional area Sr, the area Sp of the region where the first electrode 13 and the second electrode 14 overlap each other, and the value of Sr/Sp were as shown in Table 1.

Next, a voltage of up to 1.5 V was applied to the first electrode 13 and the second electrode 14 of the solid electrolyte assembly 10 produced in the above-described manner, and whether or not the limiting current occurred was examined at 600° C., 550° C., 500° C., and 450° C. in an atmosphere with an oxygen concentration of 100%. Table 1 shows the results. In Table 1, "A" indicates that the limiting current clearly occurred, "B" indicates that the limiting current was observable, and "C" indicates that no observable limiting current occurred.

Example 2

The smallest cross-sectional area Sr of the oxygen diffusion path 13A of the first electrode 13, the area Sp of the region where the first electrode 13 and the second electrode 14 overlap each other, and the value of Sr/Sp were changed as shown in Table 1. A heater 15 layer was provided on a surface on which the first electrode 13 was not formed, of two atomically flat surfaces of the silicon substrate with a thickness of 300 μm. Otherwise, a similar procedure to that of Example 1 was performed, and thus, a solid electrolyte assembly 10 was produced.

As in Example 1, an oxygen gas sensor was produced, a voltage of up to 1.5 V was applied, and whether or not the limiting current occurred was examined at 600° C., 550° C., 500° C., and 450° C. in an atmosphere with an oxygen concentration of 100%. Table 1 shows the results.

Example 3

A solid electrolyte assembly 10 was produced in a similar manner to that of Example 1, except that the smallest cross-sectional area Sr of the oxygen diffusion path 13A of the first electrode 13, the area Sp of the region where the first electrode 13 and the second electrode 14 overlap each other, and the value of Sr/Sp were changed as shown in Table 1.

As in Example 1, an oxygen gas sensor was produced, a voltage of up to 1.5 V was applied, and whether or not the limiting current occurred was examined at 600° C., 550° C., 500° C., and 450° C. in an atmosphere with an oxygen concentration of 100%. Table 1 shows the results.

Example 4

In the present example, a solid electrolyte assembly 30 shown in FIGS. 5 and 6 was produced. In the solid electrolyte assembly 30, constituent layers were formed in a similar manner to that of Example 1, except that the first electrode 13 formed on the silicon substrate 11 had a larger area than the solid electrolyte 12, and the solid electrolyte 12 and the second electrode 14 were disk-shaped. The solid electrolyte assembly 30 was produced.

The diameter r of the second electrode 14, the thickness t of the first electrode 13, the smallest cross-sectional area Sr, the area Sp of the region where the first electrode 13 and the second electrode 14 overlap each other, and the value of Sr/Sp are shown in Table 1.

As in Example 1, an oxygen gas sensor was produced, a voltage of up to 1.5 V was applied, and whether or not the limiting current occurred was examined at 600° C., 550° C., 500° C., and 450° C. in an atmosphere with an oxygen concentration of 100%. Table 1 shows the results.

Example 5

A solid electrolyte assembly 10 was produced in a similar manner to that of Example 1, except that the smallest cross-sectional area Sr of the oxygen diffusion path 13A of the first electrode 13, the area Sp of the region where the first electrode 13 and the second electrode 14 overlap each other, and the value of Sr/Sp were changed as shown in Table 1, and the ratio between YLSO and Pt in the first electrode was set to 53 vol % YLSO and 47 vol % platinum.

The smallest cross-sectional area Sr, the area Sp of the region where the first electrode 13 and the second electrode 14 overlap each other, and the value of Sr/Sp are shown in Table 1.

As in Example 1, an oxygen gas sensor was produced, a voltage of up to 1.5 V was applied, and whether or not the limiting current occurred was examined at 600° C., 550° C., 500° C., and 450° C. in an atmosphere with an oxygen concentration of 100%. Table 1 shows the results.

Comparative Example 1

A solid electrolyte assembly 30 was produced in a similar manner to that of Example 4, except that the diameter r of the second electrode 14, the thickness t of the first electrode 13, the smallest cross-sectional area Sr, the area Sp of the region where the first electrode 13 and the second electrode 14 overlap each other, and the value of Sr/Sp were changed as shown in Table 1.

As in Example 1, an oxygen gas sensor was produced, a voltage of up to 2 V was applied, and whether or not the limiting current occurred was examined at 600° C., 550° C., 500° C., and 450° C. in an atmosphere with an oxygen concentration of 100% and in an atmosphere with an oxygen concentration of 21%. Table 1 shows the results.

TABLE 1

| | t (μm) | w or πr (μm) | Sr (μm²) | Sp (μm²) | Sr/Sp | ρo (%) | Sr × ρo/ (Sp × 100) | \multicolumn{4}{c}{Whether or not limiting current occurred} | | | |
|---|---|---|---|---|---|---|---|---|---|---|---|
| | | | | | | | | 600° C. | 550° C. | 500° C. | 450° C. |
| Ex. 1 | 0.85 | 1600 | 1330 | $3.14 \times 10^6$ | $4.24 \times 10^{-4}$ | 26.42 | $1.12 \times 10^{-4}$ | A | A | A | B |
| Ex. 2 | 0.30 | 800 | 250 | $7.85 \times 10^5$ | $3.18 \times 10^{-4}$ | 23.63 | $7.51 \times 10^{-5}$ | A | A | A | A |
| Ex. 3 | 0.85 | 400 | 320 | $3.14 \times 10^6$ | $1.02 \times 10^{-4}$ | 26.42 | $2.69 \times 10^{-5}$ | A | A | A | A |
| Ex. 4 | 0.86 | 3290 | 2829 | $8.60 \times 10^6$ | $3.29 \times 10^{-4}$ | 26.02 | $8.56 \times 10^{-5}$ | A | A | A | C |
| Ex. 5 | 0.46 | 300 | 138 | $1.13 \times 10^6$ | $1.22 \times 10^{-4}$ | 24.59 | $3.00 \times 10^{-5}$ | A | A | A | A |
| Com. Ex. 1 | 1.80 | 3240 | 5832 | $8.36 \times 10^6$ | $6.98 \times 10^{-4}$ | 28.34 | $1.98 \times 10^{-4}$ | C | C | C | C |

In Examples 1 to 5 according to the present invention, the Sr/Sp values were within the range of the present invention, and therefore, when these solid electrolyte assemblies were used in oxygen gas sensors, the limiting current was observed at 500° C. or above in all cases, confirming that they can be used as limiting current type gas sensors. On the other hand, in Comparative Example 1, in which the Sr/Sp value was outside the range of the present invention, the limiting current was not observed at the measurement temperatures in the atmosphere with an oxygen concentration of 100%, and the limiting current was observed at 1.7 V in the atmosphere with an oxygen concentration of 21%. Thus, it was confirmed that the oxygen gas sensor using the solid electrolyte assembly of Comparative Example 1 cannot be used as a limiting current type gas sensor over a wide concentration range.

It was also found that, in Examples 1 to 5, since a porous membrane does not need to be provided separately from the electrodes, a solid electrolyte assembly that does not have a complex structure and enables a reduction in production time, and hence a limiting current type gas sensor can be obtained.

INDUSTRIAL APPLICABILITY

According to the present invention, a solid electrolyte assembly that does not have a complex structure and enables a reduction in production time is provided.

The invention claimed is:

1. A solid electrolyte assembly comprising:
    a substrate;
    a solid electrolyte disposed on or above the substrate; and
    a first electrode and a second electrode that are arranged opposed to each other via the solid electrolyte,
    wherein the solid electrolyte has oxide ion conductivity,
    at least a portion of the first electrode is located between the substrate and the solid electrolyte and contains a porous material,
    in a plan view of the solid electrolyte assembly, the first electrode has only one oxygen diffusion path that is formed overlapping the substrate and the solid electrolyte, and
    the solid electrolyte assembly satisfies the condition that Sr/Sp is from $1.0 \times 10^{-7}$ to $6.9 \times 10^{-4}$,
    wherein Sr represents a smallest cross-sectional area that is a cross-sectional area of the oxygen diffusion path at a location where an area of a cross section of the first electrode taken perpendicularly to an oxygen diffusing direction is smallest in a portion of the oxygen diffusion path where the oxygen diffusion path overlaps the substrate and the solid electrolyte in the plan view of the solid electrolyte assembly, and
    Sp represents an area of a region where the first electrode and the second electrode overlap each other in a plan view of the solid electrolyte.

2. The solid electrolyte assembly according to claim 1, wherein the oxygen diffusion path has a trapezoidal or rectangular cross-sectional shape when taken along a thickness direction of the oxygen diffusion path at the location where the oxygen diffusion path has the smallest cross-sectional area Sr.

3. The solid electrolyte assembly according to claim 1, wherein, in the plan view of the solid electrolyte, the first electrode has a shape including a circular portion or a polygonal portion.

4. The solid electrolyte assembly according to claim 1, wherein the first electrode contains a metal oxide, and a porosity $\rho_0$ of the first electrode is from 1.0% to 50%.

5. The solid electrolyte assembly according to claim 4, wherein a proportion of the metal oxide in the first electrode is from 1.0 to 60 vol %.

6. The solid electrolyte assembly according to claim 1, wherein the first electrode is in contact with the substrate made of silicon.

7. The solid electrolyte assembly according to claim 1, wherein a thickness of the first electrode is from 10 to 2000 nm.

8. The solid electrolyte assembly according to claim 1, wherein an average pore size of the first electrode is from 5 to 200 nm.

9. The solid electrolyte assembly according to claim 1, wherein the first electrode contains at least one of platinum group elements, gold, and alloys containing these elements.

10. The solid electrolyte assembly according to claim 1, wherein the solid electrolyte is made of a ceramic containing at least one selected from the group consisting of a composite oxide containing lanthanum and silicon, yttrium-stabilized zirconia, samarium-doped ceria, gadolinium-doped ceria, lanthanum gallate, and yttrium-doped bismuth oxide.

11. A solid electrolyte assembly comprising:
    a substrate;
    a solid electrolyte disposed on or above the substrate; and a first electrode and a second electrode that are arranged opposed to each other via the solid electrolyte, wherein the solid electrolyte has oxide ion conductivity, at least a portion of the first electrode is located between the substrate and the solid electrolyte and contains a porous material, in a plan view of the solid electrolyte assembly, the first electrode has a plurality of oxygen diffusion paths that are formed overlapping the substrate and the solid electrolyte, and the solid electrolyte assembly satisfies the condition that $\Sigma Sr/Sp$ is from $1.0 \times 10^{-7}$ to $6.9 \times 10^{-4}$, wherein Sr represents a smallest cross-sectional area that is a cross-sectional area of each oxygen diffusion path at a location where an area of a cross section of the first electrode taken perpendicularly to an oxygen diffusing direction is smallest in a portion of each oxygen diffusion path where each oxygen diffusion path overlaps the substrate and the solid electrolyte in the plan view of the solid electrolyte assembly, and $\Sigma Sr$ represents a sum total of the smallest cross-sectional areas Sr of each oxygen diffusion path, and Sp represents an area of a region where the first electrode and the second electrode overlap each other in a plan view of the solid electrolyte.

12. The solid electrolyte assembly according to claim 11, wherein each oxygen diffusion path has a trapezoidal or rectangular cross-sectional shape when taken along a thickness direction of each oxygen diffusion path at the location where each oxygen diffusion path has the smallest cross-sectional area Sr.

13. The solid electrolyte assembly according to claim 11, wherein, in the plan view of the solid electrolyte, the first electrode has a shape including a circular portion or a polygonal portion.

14. The solid electrolyte assembly according to claim 11, wherein the first electrode contains a metal oxide, and a porosity $\rho_0$ of the first electrode is from 1.0% to 50%.

15. The solid electrolyte assembly according to claim 14, wherein a proportion of the metal oxide in the first electrode is from 1.0 to 60 vol %.

16. The solid electrolyte assembly according to claim 11, wherein the first electrode is in contact with the substrate made of silicon.

17. The solid electrolyte assembly according to claim 11, wherein a thickness of the first electrode is from 10 to 2000 nm.

18. The solid electrolyte assembly according to claim 11, wherein an average pore size of the first electrode is from 5 to 200 nm.

19. The solid electrolyte assembly according to claim 11, wherein the first electrode contains at least one of platinum group elements, gold, and alloys containing these elements.

20. The solid electrolyte assembly according to claim 11, wherein the solid electrolyte is made of a ceramic containing at least one selected from the group consisting of a composite oxide containing lanthanum and silicon, yttrium-stabilized zirconia, samarium-doped ceria, gadolinium-doped ceria, lanthanum gallate, and yttrium-doped bismuth oxide.

* * * * *